Patented June 26, 1951

2,558,031

UNITED STATES PATENT OFFICE 2,558,031

PRODUCTION OF SYNTHETIC LINEAR POLYDECAMETHYLENE OXALAMIDE

Sidney James Allen, London, and James Gordon Napier Drewitt, Spondon, near Derby, England, assignors to Celanese Corporation of America, a corporation of Delaware No Drawing. Application August 26, 1947, Serial No. 770,769. In Great Britain June 18, 1947

2 Claims. (Cl. 260—78)

This invention relates to the production of synthetic polymers, and more particularly of polymers suitable for the production of filaments, films and like articles, coating compositions, and the like, and includes such articles, compositions and the like.

A number of proposals have been made in recent years for the production of materials of high molecular weight by condensation polymerisation, the products being suitable for the preparation of artificial filaments, bristles, films, foils, moulded articles and the like. One of the most important groups of such proposals involves condensation reactions which lead to the formation of amide groups in the main chain of atoms constituting the structural unit of the polymer molecule. Thus, it has been proposed to condense substantially equimolar proportions of a di-primary diamine and a dicarboxylic acid or an amide-forming derivative thereof to yield long chain polyamides and to condense substantially equimolar proportions of a di-primary diamine and urea or a di-ester of carbonic acid to yield long chain polyureas. A common feature of such proposals has been the subjection of reagents to high temperatures for a substantial period in order to effect the desired condensation to an extent sufficient to form a polymer capable of yielding filaments, foils and the like.

The reproducibility of results in such high temperature reactions depends critically upon the strict control of temperature, and this is rendered difficult by the low thermal conductivity of the materials and by the high viscosity of the reaction mixture which develops at a relatively early stage in the reaction. Even when the reaction is carried out in a solvent medium, the high viscosity of the mixture shortly after reaction commences seriously impedes efficient heat distribution through the mixture.

We have now found that polyamides may be produced in a particularly simple manner if an ester of oxalic acid is employed as the dicarboxylic acid component of a reaction mixture for producing linear polyamides from substantially equimolar proportions of a di-primary amine and a dicarboxylic acid.

According to the invention, linear polyamides are produced by a process which comprises reacting an ester of oxalic acid with a substantially equimolar proportion of a di-primary diamine at a temperature up to 100° C. Among such esters of oxalic acid we find that the lower alkyl esters, especially the methyl and ethyl esters, and the aryl esters, such as phenyl and cresyl oxalates, are particularly suitable. Ethyl oxalate for example, reacts with suitable di-primary amines without the application of heat to form linear polyamides having unusually good characteristics as compared with those of polyamides produced by heat treatment of a substantially equimolecular mixture of oxalic acid or one of its amide-forming derivatives and a diamine; if desired, however, the reaction mixture may be heated to a temperature not exceeding 100° C. with substantially similar results.

A specific example illustrating the particular advantages of the invention is provided by the production of a linear fibre-forming polymer by the reaction of ethyl oxalate and decamethylene diamine. Substantially equimolecular quantities of the two reagents are mixed in ethanol solutions (98%) at room temperature, and an immediate precipitate of a pure white polymer results, which melts at about 290° C. to a clear, colourless, viscous liquid. The polymer is insoluble in water and in common organic solvents, but is slightly soluble in m-cresol, formic acid, formamide and concentrated aqueous solutions of lithium bromide, calcium chloride, zinc chloride and similar inorganic salts. The polymer produced in this manner is sharply distinguished from that previously described as formed by heating at above 180° C. a mixture of equimolecular quantities of decamethylene diamine and oxalic acid, since the latter has a melting point of only 229° C.

The polymer formed similarly by reaction of ethyl oxalate and hexamethylene diamine in ethanol solution has a melting point of about 320° C., whereas that produced by heating hexamethylene diammonium oxalate in an inert atmosphere is found to melt at 280° C., if the heating is carried on for a short time only, while with longer heating the material chars to an infusible mass.

As evident from the two instances quoted above, the reaction between the oxalic ester and the diamines without the application of heat may be carried out in the presence of a solvent for the reagents, which is a non-solvent for the polymer formed. The reaction may also be carried out in the presence of solvents admixed with diluents which have no substantial solvent action for one or both of the reagents or for the polymer, the proportion of diluent employed being such that the reagents are dissolved in the mixture. Again, a medium may be employed in which both of the reagents and the polymer are insoluble.

In general, the solvents or diluents employed are organic substances, e. g. alcohols, ethers, hydrocarbons and the like, or mixtures thereof, which are chemically inert to the reagents and to the polymer under the conditions employed. Preferably the medium is substantially anhydrous, but proportions of water up to 5%, 10% or even more may be employed, particularly where the interaction between the amine and acid is very vigorous. Alternatively, the reaction may be carried out in the absence of both solvents and diluents, in which case it is usually necessary to cool the mass or to take other special precautions to avoid an undue spontaneous rise in temperature during the reaction. If desired, organic or inorganic, acidic or basic substances may be employed in small amounts to accelerate the reaction. For example, a fraction of a molecular percent of phosphoric acid or benzoic acid may be included in the reaction mixture. According to the proportions of such acidic or basic substances, they may serve to control the degree of polymerisation attained during the reaction, and to stabilise the product at that particular degree of polymerisation.

The di-primary amines which may be employed according to the invention are such as to react with the oxalates without substantial formation under the reaction conditions of cyclic compounds of low molecular weight. Among such amines, particularly useful members are decamethylene and hexamethylene diamines, referred to above, and tetramethylene diamine. Other diamines of the general formula $NH_2(CH_2)_nNH_2$, where $n$ is an integer of value at least 3, and preferably at least 4, may be employed. The invention may also be carried into effect with di-primary amines containing so-called hetero-atoms in the chain linking the two primary amino groups, provided that the said chain consists of at least 3, and preferably at least 4, atoms. Such compounds are, for example, 2.2'-diaminodiethyl-ether and -thioether, diethylene triamine and bis-(γ-aminopropyl)-ethylamine. The di-primary amines are not restricted to the aliphatic classes, but may be alicyclic or aromatic di-primary amines, provided that the primary amino groups are separated by chains of at least 3, and preferably at least 4, atoms. For example, p-xylylene diamine may be employed.

The amines may be such as have side-chain substitution in the chains linking the two primary amino groups, especially substitution by alkyl groups, as for example 2.5-diaminohexane. Other types of side-chain substitution, as for example in 2.2'-diaminodiethyl sulphone and 4-hydroxyheptamethylene diamine, may be employed.

It is to be understood that more than one di-primary amine may be employed in the reaction mixture so that linear polyamides may be produced, for example, from a mixture of two molecular proportions of ethyl oxalate, one molecular proportion of hexamethylene diamine and one molecular proportion of decamethylene diamine. Such co-polymers possess properties, e. g. melting point and solubility, which generally differ from those of polyamides from the oxalic ester and either diamine alone.

When the reaction is carried out in solvents or diluents, these agents are preferably selected with a view to their serving to control the maximum temperature attained during the reaction, whether due to heat generation by the reaction or to the application of external heating. For example, the employment of ethanol as the reaction medium secures a maximum temperature of about 78° C. under reflux at atmospheric pressure. However, external cooling may be applied, especially as it is advantageous to keep the reaction temperature below 50° C., and preferably below 25° C., in order to ensure uniform reaction without the development of side reactions which may tend to give a lower degree of polymerisation and/or to cross-linking of the polymer chain.

After formation of the polymer at the low temperature, i. e. at a temperature not exceeding 100° C., it may be desirable, especially when the reaction has been carried out in a solvent or diluent medium, to apply a short heat treatment at above 100° C. to the separated polymer; during such treatment the temperature should not substantially exceed the fusion temperature of the polymer. For example, the polymer may be heated at or slightly above its temperature of fusion for a short time, e. g. 5, 10 or 15 minutes, or even up to about one hour, if desired under reduced pressure, whereby it may be freed from residual solvent or diluent or from the alcohol released during reaction, and may be rendered homogeneous; such a brief heat treatment may serve to increase the degree of polymerisation of the product and to improve its fibre-forming properties. When carried out in an inert atmosphere, e. g. hydrogen or nitrogen, the heating does not result in any substantial colouration of the material or in any apparent decomposition or cross-linking of the polymer.

The polymers produced according to the invention may be employed for the production of filaments, films and other articles. When required for fibre-forming purposes, the degree of polymerisation should, in general, be such that the intrinsic viscosity of the polymer is at least 0.4, and preferably at least 0.5. Lower intrinsic viscosities may be desired for other purposes, especially for coatings. Advantageously, conditions in the reaction mixture are so adjusted, as for example by modifying the proportions of added acidic or basic substances, or the relative proportions of amine and acid, that the polymer is produced with the desired intrinsic viscosity. A slight excess of the amine or acid may also be employed for the purpose of stabilising at a selected value the viscosity of the polymer produced. Thus, for example, 0.2-5% (molar) excess of either of the reagents may be employed; the smaller the excess, the larger will be the average molecular weight of the polymer. It is to be understood that such a small excess of one of the reagents over the exact equimolecular proportion is covered by the expression "substantially equimolecular proportion" in the present specification and claims. The intrinsic viscosity is measured by the value of $\log_e (\eta_r/c)$, where $\eta_r$ is the relative viscosity of a solution of c grams of the polymer in 100 ccs. of m-cresol, c being of the order of 1 gram.

Generally, the most suitable method for producing filaments, bristles or the like is by melt spinning, i. e. by extruding a melt of the polymer through suitable orifices. The temperature of the melt of polymer to be extruded is preferably from 10 to 30° C. above the melting temperature of the polymer. This melting temperature may be modified to some extent, e. g. with a view to reducing any tendency to decomposition during spinning at very high temperatures, by mixing the polymer with suitable proportions of plasticizers, for example, sulphonamide plasticizers, phenolic plasticizers, urea and thiourea plasticizers and the like. Such plasticizers may either be left in the products or may be partially or completely extracted therefrom. Filaments may also be produced by wet or dry spinning methods from solutions in suitable solvents, for example formic acid or acetic acid, cyanhydrins, or phenolic solvents such as phenol and cresol.

The filaments so formed may, if the polymer be of sufficiently high molecular weight, be drawn out at comparatively low temperatures, or even at atmospheric temperature, to very fine filaments having high tenacity and good elasticity. The resulting filaments may then be used for the purposes to which artificial silk has in the past been applied. Generally, the products have an affinity for the dispersed insoluble type of dyestuff now generally applied to cellulose acetate, and also exhibit a good affinity for the acid wool colours.

While the invention is especially directed to the manufacture and application of fibre-forming polymers, it is not limited thereto, and embraces the production of similar polymers suitable, for example, for use as softening agents, coatings, film-forming substances and the like, with suitable regard to the effect of degree of polymerisation of the polymer upon its characteristics. Moreover, for these applications the polymers of the present invention may be mixed with other fibre-forming, film-forming or lacquer substances or other ingredients, for example, cellulose acetate, acetobutyrate, butyrate and acetostearate, ethyl cellulose, oxyethyl cellulose, oxyethyl cellulose acetate, benzyl cellulose and other cellulose derivatives, plasticizers or softening agents, dyestuffs, pigments and the like.

The following examples illustrate the invention:

Example 1

Equimolecular proportions of decamethylene diamine and ethyl oxalate were mixed at 15% (w./w.) absolute ethanol solutions at room temperature and allowed to stand for 24 hours. The precipitated polymer, after washing with ethanol and drying under vacuum, melted at 290° C. and showed fibre-forming properties from the melt. After heat treatment in a hydrogen atmosphere at 300° C. for 10 minutes, the polymer yielded somewhat stronger filaments from the melt. The product, before and after heat treatment, was partially soluble in m-cresol, formic acid, formamide and aqueous solutions of lithium bromide and zinc chloride.

Example 2

Equimolecular proportions of hexamethylene diamine and ethyl oxalate were mixed as 30% (w./w.) absolute ethanol solutions at room temperature and allowed to stand for 24 hours. The precipitated polymer, after washing with ethanol and drying under vacuum, melted at 320° C. and showed similar fibre-forming and solubility properties to the product of Example 1.

Having described our invention, what we desire to secure by Letters Patent is:
1. Polydecamethylene oxalamide having a melting point of about 290° C.
2. Process for the production of a novel polymethylene oxalamide, which comprises mixing equimolecular proportions of decamethylene diamine and ethyl oxalate in absolute ethanol solutions at room temperature and allowing the mixture to stand until polydecamethylene oxalamide having a melting point of about 290° C. precipitates from the mixture.

SIDNEY JAMES ALLEN.
JAMES GORDAN NAPIER DREWITT.

REFERENCES CITED

The following references are of record in the file of this patent:

UNITED STATES PATENTS

| Number | Name | Date |
|---|---|---|
| 2,130,523 | Carothers | Sept. 20, 1938 |
| 2,158,064 | Carothers | May 16, 1939 |

FOREIGN PATENTS

| Number | Country | Date |
|---|---|---|
| 114,623 | Sweden | July 31, 1945 |
| 882,841 | France | Mar. 8, 1943 |